United States Patent
Xu

(10) Patent No.: US 11,166,207 B2
(45) Date of Patent: Nov. 2, 2021

(54) METHOD AND APPARATUS FOR CELL SELECTION OR RESELECTION AND METHOD AND APPARATUS FOR SETTING CELL HANDOVER PARAMETER

(71) Applicants: China Mobile Communication LTD., Research Institute, Beijing (CN); China Mobile Communications Group Co., Ltd., Beijing (CN)

(72) Inventor: Xiaodong Xu, Beijing (CN)

(73) Assignees: China Mobile Communication Ltd., Research Institute, Beijing (CN); China Mobile Communications Group Co., Ltd, Beijing (CN)

(*) Notice: Subject to any disclaimer, the term of this patent is extended or adjusted under 35 U.S.C. 154(b) by 237 days.

(21) Appl. No.: 16/476,586

(22) PCT Filed: Jan. 8, 2018

(86) PCT No.: PCT/CN2018/071768
§ 371 (c)(1),
(2) Date: Jul. 9, 2019

(87) PCT Pub. No.: WO2018/130128
PCT Pub. Date: Jul. 19, 2018

(65) Prior Publication Data
US 2019/0357099 A1    Nov. 21, 2019

(30) Foreign Application Priority Data
Jan. 10, 2017 (CN) .......................... 201710016475.3

(51) Int. Cl.
*H04W 36/00* (2009.01)
*H04W 36/32* (2009.01)
(Continued)

(52) U.S. Cl.
CPC . *H04W 36/00835* (2018.08); *H04W 36/0072* (2013.01); *H04W 36/32* (2013.01); *H04W 48/20* (2013.01); *H04W 84/005* (2013.01)

(58) Field of Classification Search
CPC ....... H04W 36/00835; H04W 36/0072; H04W 36/32; H04W 84/005
See application file for complete search history.

(56) References Cited

U.S. PATENT DOCUMENTS

| 6,052,598 A | 4/2000 | Rudrapatna et al. |
| 2012/0135737 A1 | 5/2012 | Yoshihara et al. |

(Continued)

FOREIGN PATENT DOCUMENTS

| CN | 101583169 A | 11/2009 |
| CN | 101873566 A | 10/2010 |

(Continued)

OTHER PUBLICATIONS

Extended European Search Report for European Patent Application No. 18738891.3, dated Jul. 6, 2020, 10 pages.

(Continued)

*Primary Examiner* — Asghar H Bilgrami
(74) *Attorney, Agent, or Firm* — Price Heneveld LLP

(57) ABSTRACT

A method and an apparatus for cell selection or reselection and a method and an apparatus for setting a cell handover parameter are provided. The method for cell selection or reselection includes: acquiring speed priorities of one or more cells and a movement speed grade of a terminal device; and performing cell selection or cell reselection according to the speed priorities and the movement speed grade. According to the embodiments of the present disclosure, the terminal device acquires speed priorities of network cells and its own movement speed grade, so as to firstly perform a cell filtering by using the speed priority and then perform (Continued)

another cell filtering by using a frequency priority during the cell selection to select a target cell to camp on, to enable the terminal device to distinguish between cells with different speed priorities and preferentially camp on a cell matching a movement speed of the terminal device, so that the terminal device camps on cells more efficiently and cells with different priorities serve the terminal device more efficiently.

10 Claims, 1 Drawing Sheet

(51) Int. Cl.
*H04W 48/20* (2009.01)
*H04W 84/00* (2009.01)

(56) References Cited

U.S. PATENT DOCUMENTS

| | | | |
|---|---|---|---|
| 2013/0053038 A1 | 2/2013 | Lee et al. | |
| 2015/0264622 A1* | 9/2015 | Ueda | H04W 36/32 |
| | | | 455/438 |
| 2015/0312826 A1* | 10/2015 | Yiu | H04W 48/16 |
| | | | 455/437 |
| 2016/0302123 A1* | 10/2016 | Fujishiro | H04W 28/18 |

FOREIGN PATENT DOCUMENTS

| | | |
|---|---|---|
| CN | 101998555 A | 3/2011 |
| CN | 102474788 A | 5/2012 |
| CN | 102833801 A | 12/2012 |
| CN | 103765957 A | 4/2014 |
| CN | 103874146 A | 6/2014 |
| EP | 2728937 A1 | 5/2014 |
| EP | 2779749 A1 | 9/2014 |
| EP | 2892281 A1 | 7/2015 |
| JP | 2017516363 A | 6/2017 |

OTHER PUBLICATIONS

Office Action for Japanese Patent Application No. 2019-557666, dated Jul. 28, 2020, 10 pages.
Alcatel-Lucent et al., "On UE-speed-aware methods for improving the mobility performance in HetNets", 3GPP TSG-RAN WG2 Meeting #75bis, R2-115211, Oct. 10, 2011, China, 4 pages.

* cited by examiner

METHOD AND APPARATUS FOR CELL SELECTION OR RESELECTION AND METHOD AND APPARATUS FOR SETTING CELL HANDOVER PARAMETER

CROSS-REFERENCE TO RELATED APPLICATION

The present application is a U.S. national phase application of a PCT Application No. PCT/CN2018/071768 filed on Jan. 8, 2018, which claims a priority of Chinese Patent Application No. 201710016475.3 filed in China on Jan. 10, 2017, a disclosure of the Chinese Patent Application is incorporated in its entirety by reference herein.

TECHNICAL FIELD

Embodiments of the present disclosure relate to the field of communication technology, in particular to a method and an apparatus for cell selection or reselection and a method and an apparatus for setting a cell handover parameter.

BACKGROUND

In existing technical solutions such as Long-Term Evolution (LTE), frequency priority events are separately defined for idle state users and connected state users to meet the requirement of planning loads on networks at different frequencies. For example, different frequency priorities may be used for a cell in the 1.9 GHz frequency band and a cell in the 2.6 GHz frequency band, so that in conjunction with an appropriate cell reselection threshold, the distribution of idle state users among the cells in the 1.9 GHz frequency band and the cells in the 2.6 GHz frequency band may be controlled as a whole. As far as the connected state is concerned, a proper distribution of users among networks at different frequencies is ensured by configuring measurement events (for example, A2, A3, A4, and A5) and measurement reports and using a strategy same as that for the idle state. However, in some scenarios, for example, in the case that there is an overlapping area between a high-speed railway private network and a common public network, the foregoing setting of frequency priorities has some problems.

1. Even if different frequency priorities are used for the high-speed railway private network and the common public network, to ensure that a private network user can rapidly select/return to the private network, a frequency of the private network is usually provided with a higher priority. However, this priority applies to all terminal device users. As a result, a large number of common public network users/ground users in a coverage area of the private network tend to camp on the private network, whereby private network resources are heavily occupied by the common public network users.

2. In the case that a same frequency is used for both the high-speed railway private network and the common public network, the frequency priority of a public network cell and the frequency priority of a private network cell can't be distinguished from each other, causing a terminal device to reselect between the private network cell and the public network cell frequently. Moreover, public network users have difficulty in distinguishing between the private network cell and the public network cell. As a result, a large number of common public network users/ground users in a coverage area of the private network also tend to camp on the private network, whereby private network resources are heavily occupied by the common public network users.

SUMMARY

(1) Technical Problem to be Solved

An object of the present disclosure is to provide a method and an apparatus for cell selection or reselection and a method and an apparatus for setting a cell handover parameter, to solve the problem in the related art that private network resources are heavily wasted because a terminal device cannot distinguish between a high-speed railway private network and a common public network.

(2) Technical Solutions

To achieve the foregoing object, in a first aspect, the present disclosure provides in some embodiments a method for cell selection or reselection, applied to a terminal device, and including: acquiring speed priorities of one or more cells and a movement speed grade of the terminal device; and performing cell selection or cell reselection according to the speed priorities and the movement speed grade.

In a possible embodiment of the present disclosure, each of the speed priorities may further include speed priority range information, and the speed priority range information is used to identify a service range of a speed priority of a cell; and the step of performing cell selection or cell reselection according to the speed priorities and the movement speed grade includes: selecting, by comparing the movement speed grade with the speed priorities of the one or more cells, at least one cell whose speed priority matches the movement speed grade from the one or more cells as at least one candidate cell, where the terminal device is in a service range of the speed priority of the at least one candidate cell; and further performing cell selection or cell reselection in the at least one candidate cell.

In a possible embodiment of the present disclosure, the step of further performing cell selection or cell reselection in the at least one candidate cell includes: further performing cell selection or cell reselection in the at least one candidate cell according to a cell frequency priority.

In a possible embodiment of the present disclosure, the step of selecting, by comparing the movement speed grade with the speed priorities of the one or more cells, at least one cell whose speed priority matches the movement speed grade from the one or more cells as at least one candidate cell includes: acquiring level differences between the speed priorities of the one or more cells and the movement speed grade of the terminal device; and determining at least one cell corresponding to a smallest level difference between the speed priorities of the one or more cells and the movement speed grade of the terminal device as the at least one candidate cell, where the speed priority of the at least one candidate cell matches the movement speed grade of the terminal device.

In a possible embodiment of the present disclosure, when one of the level differences is equal to 0, the speed priority of the corresponding candidate cell completely matches the movement speed grade of the terminal device; and when one of the level differences is not equal to 0, in the case of an upward matching, the speed priority of the corresponding candidate cell is higher in terms of level than the movement speed grade of the terminal device; or, in the case of a downward matching, the speed priority of the corresponding candidate cell is lower in terms of level than the movement speed grade of the terminal device.

In a possible embodiment of the present disclosure, when one of the level differences is not equal to 0, whether the upward matching or the downward matching is to be performed is determined according to a prior agreement or according to an indication from a network side device.

In a possible embodiment of the present disclosure, if level differences between speed priorities of all neighboring cells in current neighboring cell configuration information of the terminal device and the movement speed grade of the terminal device are all greater than the smallest level difference, and a strength of a signal received by the terminal device from a current cell is greater than a preset threshold, the terminal device does not start a process of searching for a cell whose speed priority has a smaller level difference from the movement speed grade of the terminal device.

In a second aspect, the present disclosure further provides in some embodiments a method for setting a cell handover parameter, applied to a network side device, and including: setting, according to a movement speed grade of a terminal device and speed priorities of one or more cells, a parameter for triggering an event reporting procedure or a handover procedure of the terminal device.

In a possible embodiment of the present disclosure, the step of setting, according to a movement speed grade of a terminal device and speed priorities of one or more cells, a parameter for triggering an event reporting procedure or a handover procedure of the terminal device includes: setting mapping relationships between each movement speed grade and all speed priorities, respectively; and setting, for each mapping relationship pair, the parameter for triggering the event reporting procedure or the handover procedure of the terminal device, where the mapping relationship pair refers to a pair made up of two mapping relationships of the mapping relationships between each movement speed grade and all the speed priorities.

In a possible embodiment of the present disclosure, the parameter for triggering the event reporting procedure or the handover procedure of the terminal device includes: a speed scale factor for triggering the event reporting procedure or the handover procedure of the terminal device and/or a hysteresis parameter for triggering the event reporting procedure or the handover procedure of the terminal device.

In a third aspect, the present disclosure further provides in some embodiments an apparatus for cell selection or reselection, applied to a terminal device, and including: an acquisition module, configured to acquire speed priorities of one or more cells and a movement speed grade of the terminal device; and a cell selection module, configured to perform cell selection or cell reselection according to the speed priorities and the movement speed grade.

In a possible embodiment of the present disclosure, each of the speed priorities may further include speed priority range information, and the speed priority range information is used to identify a service range of a speed priority of a cell; and the cell selection module includes: a first selection submodule, configured to select, by comparing the movement speed grade with the speed priorities of the one or more cells, at least one cell whose speed priority matches the movement speed grade from the one or more cells as at least one candidate cell, where the terminal device is in a service range of the speed priority of the at least one candidate cell; and a second selection submodule, configured to further perform cell selection or cell reselection in the at least one candidate cell.

In a possible embodiment of the present disclosure, the second selection submodule includes: a selection unit, configured to further perform cell selection or cell reselection in the at least one candidate cell according to a cell frequency priority.

In a possible embodiment of the present disclosure, the first selection submodule includes: a difference acquisition unit, configured to acquire level differences between the speed priorities of the one or more cells and the movement speed grade of the terminal device; and a determination unit, configured to determine at least one cell corresponding to a smallest level difference between the speed priorities of the one or more cells and the movement speed grade of the terminal device as the at least one candidate cell, where the speed priority of the at least one candidate cell matches the movement speed grade of the terminal device.

In a possible embodiment of the present disclosure, when one of the level differences is equal to 0, the speed priority of the corresponding candidate cell completely matches the movement speed grade of the terminal device; and when one of the level differences is not equal to 0, in the case of an upward matching, the speed priority of the corresponding candidate cell is higher in terms of level than the movement speed grade of the terminal device; or, in the case of a downward matching, the speed priority of the corresponding candidate cell is lower in terms of level than the movement speed grade of the terminal device.

In a possible embodiment of the present disclosure, when one of the level differences is not equal to 0, whether the upward matching or the downward matching is to be performed is determined according to a prior agreement or according to an indication from a network side device.

In a possible embodiment of the present disclosure, if level differences between speed priorities of all neighboring cells in current neighboring cell configuration information of the terminal device and the movement speed grade of the terminal device are all greater than the smallest level difference, and a strength of a signal received by the terminal device from a current cell is greater than a preset threshold, the terminal device does not start a process of searching for a cell whose speed priority has a smaller level difference from the movement speed grade of the terminal device.

In a fourth aspect, the present disclosure further provides in some embodiments an apparatus for setting a cell handover parameter, applied to a network side device, and including: a setting module, configured to set, according to a movement speed grade of a terminal device and speed priorities of one or more cells, a parameter for triggering an event reporting procedure or a handover procedure of the terminal device.

In a possible embodiment of the present disclosure, the setting module includes: a first setting submodule, configured to set mapping relationships between each movement speed grade and all speed priorities, respectively; and a second setting submodule, configured to set, for each mapping relationship pair, the parameter for triggering the event reporting procedure or the handover procedure of the terminal device, where the mapping relationship pair refers to a pair made up of two mapping relationships of the mapping relationships between each movement speed grade and all the speed priorities.

In a possible embodiment of the present disclosure, the parameter for triggering the event reporting procedure or the handover procedure of the terminal device includes: a speed scale factor for triggering the event reporting procedure or the handover procedure of the terminal device and/or a hysteresis parameter for triggering the event reporting procedure or the handover procedure of the terminal device.

In a fifth aspect, the present disclosure further provides in some embodiments a terminal device, including: a processor, a memory, and a computer program stored in the memory and configured to be executed by the processor, where the processor is configured to execute the computer program to implement the steps in the foregoing method for cell selection or reselection.

In a sixth aspect, the present disclosure further provides in some embodiments a network side device, including: a processor, a memory, and a computer program stored in the memory and configured to be executed by the processor, where the processor is configured to execute the computer program to implement the steps in the foregoing method for setting a cell handover parameter.

In a seventh aspect, the present disclosure further provides in some embodiments a computer readable storage medium storing therein a computer program, where the computer program is configured to be executed by a processor, to implement steps in the foregoing method for cell selection or reselection through a terminal device.

In an eighth aspect, the present disclosure further provides in some embodiments a computer readable storage medium storing therein a computer program, where the computer program is configured to be executed by a processor, to implement steps in the foregoing method for setting a cell handover parameter through a network side device.

(3) Beneficial Effects

The foregoing technical solutions provided in embodiments of the present disclosure have the following beneficial effects.

According to the method and apparatus for cell selection or reselection and the method and apparatus for setting a cell handover parameter provided in the embodiments of the present disclosure, a terminal device acquires speed priorities of network cells and its own movement speed grade, so as to firstly perform a cell filtering by using the speed priority and then perform another cell filtering by using a frequency priority during the cell selection to select a target cell to camp on, to enable the terminal device to distinguish between cells with different speed priorities and preferentially camp on a cell matching a movement speed of the terminal device, so that the terminal device camps on cells more efficiently and cells with different priorities serve the terminal device more efficiently.

BRIEF DESCRIPTION OF THE DRAWINGS

To describe the technical solutions in the embodiments of the present disclosure or in the related art more clearly, the accompanying drawings required for describing the embodiments are briefly described hereinafter. Apparently, the drawings accompanying the following descriptions show only some embodiments of the present disclosure, and a person of ordinary skill in the art may still derive other drawings from these accompanying drawings without creative efforts.

DETAILED DESCRIPTION

The technical solutions in the embodiments of the present disclosure are clearly and thoroughly described below with reference to the accompanying drawings of the embodiments of the present disclosure. Apparently, the described embodiments are some embodiments of the present disclosure, but are not all the embodiments. Based on the embodiments of the present disclosure, all other embodiments derived by a person of ordinary skill in the art without any creative efforts shall fall within the scope of the present disclosure.

To make the technical problem to be solved, technical solutions, and advantages of the embodiments of the present disclosure more clearly, detailed descriptions are provided below with reference to the accompanying drawings and specific embodiments.

First Embodiment

Figure 1:
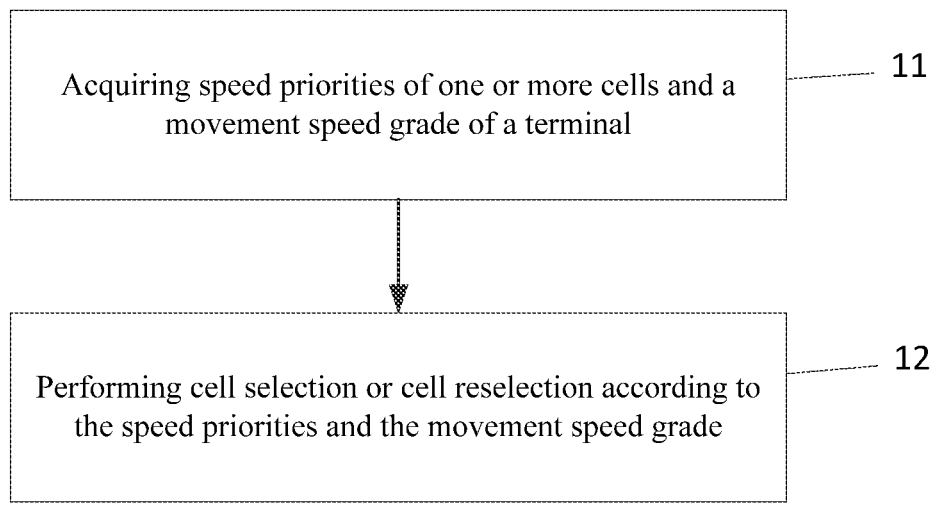
FIG. 1 is a flowchart of steps in a method for cell selection or reselection according to a first embodiment of the present disclosure.

As shown in FIG. 1, the present disclosure provides in the first embodiment a method for cell selection or reselection. The method is applied to a terminal device. The method includes the following steps.

Step 11: Acquiring speed priorities of one or more cells and a movement speed grade of the terminal device.

Step 12: Performing cell selection or cell reselection according to the speed priorities and the movement speed grade.

A network side device assigns a cell speed priority for each cell, and uses a speed priority identifier to indicate the cell speed priority. For example, the cell speed priorities may include high speed, medium speed, and low speed or may include level 1, level 2, and level 3. Specifically, a cell speed priority of a high-speed railway private network cell may be set to high speed or level 1, so that the high-speed railway private network cell preferentially serves a terminal device moving at high speed. A cell speed priority of a common public network cell may be set to medium speed or low speed or may be set to level 2 or level 3, so that the common public network cell preferentially serves a terminal device moving at medium speed or low speed or a stationary terminal device.

A terminal device may determine its own movement speed grade by estimating its own movement speed, and the movement speed grade also includes high speed, medium speed, and low speed, or includes level 1, level 2, and level 3. The terminal device selects, according to its own movement speed grade, a cell whose speed priority matches the movement speed grade of the terminal device side to camp on.

Specifically, the terminal device may determine, according to a speed priority of a cell, whether the cell is a private network cell suitable for serving a user moving at high speed or a common public network cell suitable for serving a user moving at medium speed. As a result, the terminal device may select a matching cell to camp on according to its own movement speed grade, so as to prevent high-speed railway private network resources from being heavily occupied by users at medium movement speed.

Specifically, in the first embodiment of the present disclosure, each of the speed priorities may further include speed priority range information, and the speed priority range information is used to identify a service range of a speed priority of a cell; and the step 12 includes the following substeps.

Substep 121: Selecting, by comparing the movement speed grade with the speed priorities of the one or more cells, at least one cell whose speed priority matches the movement speed grade from the one or more cells as at least one candidate cell, where the terminal device is in a service range of the speed priority of the at least one candidate cell.

Substep 122: Further performing cell selection or cell reselection in the at least one candidate cell.

Specifically, the substep 122 includes the following sub-substep.

Sub-substep 1221: Further performing cell selection or cell reselection in the at least one candidate cell according to a cell frequency priority.

In the first embodiment of the present disclosure, the terminal device performs cell filtering on a plurality of cells once to determine the candidate cell. One or more candidate cells may be determined. A speed priority of such a candidate cell matches the movement speed grade of the terminal device. After a plurality of candidate cells are determined, the terminal device performs cell filtering on the candidate cells again according to the frequency priorities thereof to determine a target cell, and camps on the target cell.

Further, the substep 121 in the foregoing embodiment of the present disclosure includes the following sub-sub steps.

Sub-substep 1211: Acquiring level differences between the speed priorities of the one or more cells and the movement speed grade of the terminal device.

Sub-substep 1212: Determining at least one cell corresponding to a smallest level difference between the speed priorities of the one or more cells and the movement speed grade of the terminal device as the at least one candidate cell, where the speed priority of the at least one candidate cell matches the movement speed grade of the terminal device.

Optionally, if the level difference includes 0, 1, and 2, then the smallest level difference is 0 at this time, that is, a speed priority of a cell is the same as the movement speed grade of the terminal device, and a cell corresponding to the level difference of 0 is the candidate cell. If the level difference includes 1 and 2, then the smallest level difference is 1 at this time, that is, a speed priority of a cell is close to the movement speed grade of the terminal device, and a cell corresponding to the level difference of 1 is determined as the candidate cell.

Specifically, when one of the level differences is equal to 0, the speed priority of the corresponding candidate cell completely matches the movement speed grade of the terminal device; and when one of the level differences is not equal to 0, in the case of an upward matching, the speed priority of the corresponding candidate cell is higher in terms of level than the movement speed grade of the terminal device; or, in the case of a downward matching, the speed priority of the corresponding candidate cell is lower in terms of level than the movement speed grade of the terminal device.

Specifically, when one of the level differences is not equal to 0, whether the upward matching or the downward matching is to be performed is determined according to a prior agreement or according to an indication from the network side device.

It should be noted that when one of the level differences is not equal to 0, the movement speed grade of the terminal device may be higher than the speed priority of the candidate cell or may be lower than the speed priority of the candidate cell. For example, when the level difference is equal to 1, assuming that the movement speed grade of the terminal device is medium speed (or the movement speed grade is level 2), a speed priority of a cell may be high speed (level 1) or may be low speed (level 3). In a process of determining the candidate cell, according to a preset rule, the terminal device may preferentially select a cell whose speed priority is higher than the movement speed grade or may preferentially select a cell whose speed priority is lower than the movement speed grade or may select both a cell whose speed priority is greater than the movement speed grade and a cell whose speed priority is lower than the movement speed grade.

It should further be noted that the preset rule may be preset by the terminal device or may be preconfigured by the network side device. This is not specifically limited herein.

In addition, if level differences between speed priorities of all neighboring cells in current neighboring cell configuration information of the terminal device and the movement speed grade of the terminal device are all greater than the smallest level difference, and a strength of a signal received by the terminal device from a current cell is greater than a preset threshold, the terminal device does not start a process of searching for a cell whose speed priority has a smaller level difference from the movement speed grade of the terminal device.

In conclusion, a speed dimension-based priority list is introduced at the network side device, and a cell of the network side device may be separately set as a cell suitable for a terminal device moving at high speed, a cell suitable for a terminal device moving at medium speed or a cell suitable for a terminal device moving at low speed. This is not specifically limited herein. A speed priority of a cell may be simply set to high speed or low speed, or alternatively may be set to high speed, medium speed or low speed or may be set to level 1, level 2 or level 3, among other forms, to identify a different speed priority. A determination of a corresponding priority based on the movement speed grade of the terminal device is introduced at the terminal device. The terminal device determines whether the terminal device should preferentially camp on a cell with a speed priority of high speed or a cell with a speed priority of low speed based on an estimation of its own movement speed, and then select a corresponding cell to camp on in conjunction with speed priority identifiers/a list of speed priorities of the cells on a network side.

It should be noted that the terminal device performs cell selection with reference to both its own movement speed grade and speed priorities of the cells on the network side. Compared with the related art, the terminal device needs to complete a process of matching the movement speed grade of its own with the speed priorities of the cells before a process of performing cell selection based on a frequency priority.

For example, when a user is on a high-speed train, a movement speed grade of the terminal device is high speed. In this case, a process in which the terminal device performs cell selection or cell reselection is as follows.

A cell A and a cell B are high-speed railway private network cells, a cell C is a highway cell, and a cell D is a common public network cell. The terminal device acquires speed priorities of nearby cells, including: the cell A with a speed priority of high speed; the cell B with a speed priority of high speed; the cell C with a speed priority of medium speed; and the cell D with a speed priority of low speed.

The terminal device determines the cell A and the cell B as candidate cells with reference to both the movement speed grade of the terminal device and the speed priorities of the cells. Further, the terminal device performs cell selection according to the frequency priorities of the cell A and the cell B. A selection according to a frequency priority is the related art, and details thereof are omitted herein.

By means of the method for cell selection or reselection provided in the first embodiment of the present disclosure, a terminal device can distinguish a high-speed railway private network from a common public network, distribution or camping of idle state users at different movement speeds on the high-speed railway private network and the common public network can be effectively controlled, to prevent a large number of public network users from camping on the high-speed railway private network, so as to prevent private network resources from being heavily occupied by common public network users, so that a possibility of disconnection of the terminal device or degradation of experience is minimized.

Second Embodiment

Figure 2:
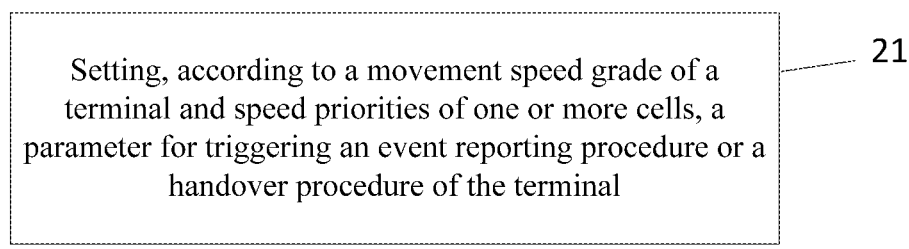
FIG. 2 is a flowchart of steps in a method for setting a cell handover parameter according to a second embodiment of the present disclosure.

As shown in FIG. 2, the present disclosure provides in the second embodiment a method for setting a cell handover parameter. The method is applied to a network side device. The method includes the following step.

Step 21: Setting, according to a movement speed grade of a terminal device and speed priorities of one or more cells, a parameter for triggering an event reporting procedure or a handover procedure of the terminal device. The parameter is further used by the terminal device to perform cell selection or reselection.

The method for setting a cell handover parameter provided in the second embodiment of the present disclosure is applied to a terminal device in a connected state, that is, the method is applied to the parameter for the terminal device in the connected state to trigger the event reporting procedure or the handover procedure of the terminal device during movement. For the terminal device in a connected state, different handover parameters are set for handovers between cells with different speed priorities. For example, when the terminal device is to be handed over from a serving cell to a target cell, if the target cell and the serving cell have the same speed priority, then ordinary event triggering is used. If the target cell and the serving cell have different speed priorities, different event triggering is used or certain hysteresis is introduced.

Specifically, the step 21 in the second embodiment of the present disclosure includes the following substeps.

Substep 211: Setting mapping relationships between each movement speed grade and all speed priorities, respectively.

Specifically, assuming the movement speed grade of the terminal device includes: high speed, medium speed, and low speed and the speed priorities of the cells include: high speed, medium speed, and low speed, correspondingly, the mapping relationships specifically include: 1) high-speed terminal device-high-speed cell; 2) high-speed terminal device-medium-speed cell; 3) high-speed terminal device-low-speed cell; 4) medium-speed terminal device-high-speed cell; 5) medium-speed terminal device-medium-speed cell; 6) medium-speed terminal device-low-speed cell; 7) low-speed terminal device-high-speed cell; 8) low-speed terminal device-medium-speed cell; and 9) low-speed terminal device-low-speed cell.

Substep 211: Setting different relationship pairs, specifically including: 1) high-speed terminal device-high-speed cell to medium-speed cell; 2) high-speed terminal device-medium-speed cell to high-speed cell; 3) high-speed terminal device-high-speed cell to low-speed cell; 4) high-speed terminal device-low-speed cell to high-speed cell; 5) high-speed terminal device-medium-speed cell to low-speed cell; 6) high-speed terminal device-low-speed cell to medium-speed cell; 7) medium-speed terminal device-high-speed cell to medium-speed cell; 8) medium-speed terminal device-medium-speed cell to high-speed cell; 9) medium-speed terminal device-high-speed cell to low-speed cell; 10) medium-speed terminal device-low-speed cell to high-speed cell; 11) medium-speed terminal device-medium-speed cell to low-speed cell; 12) medium-speed terminal device-low-speed cell to medium-speed cell; 13) low-speed terminal device-high-speed cell to medium-speed cell; 14) low-speed terminal device-medium-speed cell to high-speed cell; 15) low-speed terminal device-high-speed cell to low-speed cell; 16) low-speed terminal device-low-speed cell to high-speed cell; 17) low-speed terminal device-medium-speed cell to low-speed cell; and 18) low-speed terminal device-low-speed cell to medium-speed cell.

Substep 212: Setting, for each mapping relationship pair, the parameter for triggering the event reporting procedure or the handover procedure of the terminal device, where the mapping relationship pair refers to a pair made up of two mapping relationships of the mapping relationships between each movement speed grade and all the speed priorities.

Parameters are respectively set for foregoing nine mapping relationship pairs in this step, and the parameter for triggering the event reporting procedure or the handover procedure of the terminal device includes: a speed scale factor for triggering the event reporting procedure or the handover procedure of the terminal device and/or a hysteresis parameter for triggering the event reporting procedure or the handover procedure of the terminal device.

Specifically, a parameter reflecting a mapping relationship between the movement speed grade of the terminal device and a speed priority of a target cell is introduced in q-HystSF in mobility State parameters related to the terminal device.

For example, the hysteresis parameter is defined as follows:

| | |
|---|---|
| SpeedStateReselectionpars | SEQUENCE{ |
| Mobilitystateparameters | Mobilitystateparameters |
| q-HystSF | SEQUENCE{ |
| sf-High-High-to-High | ENUMERATED{ dB0}, |
| sf-High-High-to-Medium | ENUMERATED{ dB-4, dB-2}, |
| sf-High-High-to-Low | ENUMERATED{ dB-6, dB-4}, |
| sf-Medium-Medium-to-High | ENUMERATED{ dB-6, dB-4, dB-2, dB0}, |
| sf-Medium-Medium-to-Low | ENUMERATED{ dB-6, dB-4, dB-2, dB0}, |
| sf-Medium-Medium-to-Medium | ENUMERATED{ dB-6, dB-4, dB-2, dB0}, | where, in sf-High-High-to-High, the first movement speed identifier (High) represents a current movement speed grade of the terminal device; the second movement speed identifier (High) represents a speed priority of a current serving cell of the terminal device; and the third movement speed identifier (High) represents a speed priority of a target cell, that is, the terminal device needs to be handed over to the target cell.

For another example, a speed scale factor is defined as follows:

```
--ASN1 START
  SpeedStateScaleFactors::=    SEQUENCE{
    sf-Medium                    ENUMERATED{0Dot25, 0Dot5, 0Dot75, 1Dot0},
    sf-High-High-to-High              ENUMERATED{1Dot0},
    sf-High-to-High-Medium            ENUMERATED{2Dot0, 4Dot0},
    sf-High-to-High-Low               ENUMERATED{8Dot0, 16Dot0},
  }
--ASN1 STOP
```

Where, in sf-High-High-to-High, the first movement speed identifier (High) represents a current movement speed grade of the terminal device; the second movement speed identifier (High) represents a speed priority of a current serving cell of the terminal device; and the third movement speed identifier (High) represents a speed priority of a target cell, that is, the terminal device needs to be handed over to the target cell.

In conclusion, a cell handover parameter set by using the method for setting a cell handover parameter in the second embodiment of the present disclosure enables a terminal device to perform cell handover based on not only a movement speed of the terminal device but also a speed priority of a target cell, thereby improving handover efficiency. Specifically, when the terminal device is handed over from a high-speed cell to a high-speed cell, a hysteresis amount is relatively small; when the terminal device is handed over from a high-speed cell to a low-speed cell, a hysteresis amount is relatively large; and so on. It should further be noted that the method for setting the cell handover parameter may also be used to set a cell selection or reselection parameter.

Third Embodiment

Figure 3:
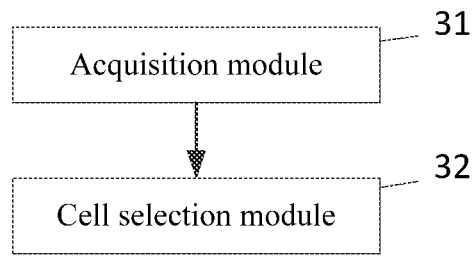
FIG. 3 is a schematic structural diagram of an apparatus for cell selection or reselection according to a third embodiment of the present disclosure.

To further achieve the foregoing object, as shown in FIG. 3, the present disclosure further provides in the third embodiment an apparatus for cell selection or reselection. The apparatus is applied to a terminal device. The apparatus includes: an acquisition module 31, configured to acquire speed priorities of one or more cells and a movement speed grade of the terminal device; and a cell selection module 32, configured to perform cell selection or cell reselection according to the speed priorities and the movement speed grade.

Specifically, in the third embodiment of the present disclosure, each of the speed priorities may further include speed priority range information, and the speed priority range information is used to identify a service range of a speed priority of a cell; and the cell selection module includes: a first selection submodule, configured to select, by comparing the movement speed grade with the speed priorities of the one or more cells, at least one cell whose speed priority matches the movement speed grade from the one or more cells as at least one candidate cell; where the terminal device is in a service range of the speed priority of the at least one candidate cell; and a second selection submodule, configured to further perform cell selection or cell reselection in the at least one candidate cell.

Specifically, the second selection submodule in the third embodiment of the present disclosure includes: a selection unit, configured to further perform cell selection or cell reselection in the at least one candidate cell according to a cell frequency priority.

Specifically, the first selection submodule in the third embodiment of the present disclosure includes: a difference acquisition unit, configured to acquire level differences between the speed priorities of the one or more cells and the movement speed grade of the terminal device; and a determination unit, configured to determine at least one cell corresponding to a smallest level difference between the speed priorities of the one or more cells and the movement speed grade of the terminal device as the at least one candidate cell, where the speed priority of the at least one candidate cell matches the movement speed grade of the terminal device.

Specifically, in the third embodiment of the present disclosure, when one of the level differences is equal to 0, the speed priority of the corresponding candidate cell completely matches the movement speed grade of the terminal device; and when one of the level differences is not equal to 0, in the case of an upward matching, the speed priority of the corresponding candidate cell is higher in terms of level than the movement speed grade of the terminal device; or, in the case of a downward matching, the speed priority of the corresponding candidate cell is lower in terms of level than the movement speed grade of the terminal device.

Specifically, in the third embodiment of the present disclosure, when one of the level differences is not equal to 0, whether the upward matching or the downward matching is to be performed is determined according to a prior agreement or according to an indication from a network side device.

Specifically, in the third embodiment of the present disclosure, if level differences between speed priorities of all neighboring cells in current neighboring cell configuration information of the terminal device and the movement speed grade of the terminal device are all greater than the smallest level difference, and a strength of a signal received by the terminal device from a current cell is greater than a preset threshold, the terminal device does not start a process of searching for a cell whose speed priority has a smaller level difference from the movement speed grade of the terminal device.

In conclusion, by means of the cell selection apparatus provided in the third embodiment of the present disclosure, a terminal device can distinguish a high-speed railway private network from a common public network, access of idle state users at different movement speeds to the high-speed railway private network and the common public network can be effectively controlled, to prevent a large number of public network users from camping on the high-speed railway private network, so as to prevent private network resources from being heavily occupied by common public network users, so that a possibility of disconnection or degradation of experience is minimized.

It should be noted that the cell selection apparatus provided in the third embodiment of the present disclosure is an apparatus capable of performing the foregoing method for cell selection or reselection provided in the first embodiment, so that all the embodiments of the foregoing method for cell selection or reselection are applicable to the cell selection apparatus, and all can achieve the same or similar beneficial effects.

Fourth Embodiment

Figure 4:
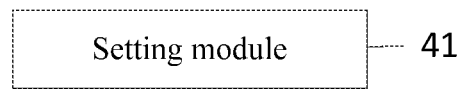
FIG. 4 is a schematic structural diagram of an apparatus for setting a cell handover parameter according to a fourth embodiment of the present disclosure.

To further achieve the foregoing object, as shown in FIG. 4, the present disclosure further provides in the fourth embodiment an apparatus for setting a cell handover parameter. The apparatus is applied to a network side device. The apparatus includes: a setting module 41, configured to set, according to a movement speed grade of a terminal device and speed priorities of one or more cells, a parameter for triggering an event reporting procedure or a handover procedure of the terminal device.

Specifically, the setting module in the fourth embodiment of the present disclosure includes: a first setting submodule, configured to set mapping relationships between each movement speed grade and all speed priorities, respectively; and a second setting submodule, configured to set, for each mapping relationship pair, the parameter for triggering the event reporting procedure or the handover procedure of the terminal device, where the mapping relationship pair refers to a pair made up of two mapping relationships of the mapping relationships between each movement speed grade and all the speed priorities.

Specifically, in the fourth embodiment of the present disclosure, the parameter for triggering the event reporting procedure or the handover procedure of the terminal device includes: a speed scale factor for triggering the event reporting procedure or the handover procedure of the terminal device and/or a hysteresis parameter for triggering the event reporting procedure or the handover procedure of the terminal device.

In conclusion, a cell handover parameter set by using the apparatus for setting a cell handover parameter in the fourth embodiment of the present disclosure enables a terminal device to perform cell handover based on not only a movement speed of the terminal device but also a speed priority of a target cell, thereby improving handover efficiency. Specifically, when the terminal device is handed over from a high-speed cell to a high-speed cell, a hysteresis amount is relatively small; when the terminal device is handed over from a high-speed cell to a low-speed cell, a hysteresis amount is relatively large; and so on.

It should be noted that the apparatus for setting a cell handover parameter provided in the fourth embodiment of the present disclosure is an apparatus capable of performing the foregoing method for setting a cell handover parameter provided in the second embodiment, so that all the embodiments of the foregoing method for setting a cell handover parameter are applicable to the apparatus for setting a cell handover parameter, and all can achieve the same or similar beneficial effects. The foregoing descriptions are only preferred implementations of the present disclosure. It should be noted that improvements and modifications may be made in the embodiments by a person skilled in the art without departing from the principle of the present disclosure. These improvements and modifications should be construed as falling within the scope of the present disclosure.

What is claimed is:

1. A method for cell selection or reselection, applied to a terminal device, and comprising:
    acquiring speed priorities of one or more cells and a movement speed grade of the terminal device; and
    performing cell selection or cell reselection according to the speed priorities and the movement speed grade;
    wherein each of the speed priorities further comprises speed priority range information, and the speed priority range information is configured to identify a service range of a speed priority of a cell; and
    the performing cell selection or cell reselection according to the speed priorities and the movement speed grade comprises:
    selecting, by comparing the movement speed grade with the speed priorities of the one or more cells, at least one cell whose speed priority matches the movement speed grade from the one or more cells as at least one candidate cell, wherein the terminal device is in the service range of the speed priority of the at least one candidate cell; and
    further performing the cell selection or cell reselection in the at least one candidate cell according to a cell frequency priority.

2. The method according to claim 1, wherein the selecting, by comparing the movement speed grade with the speed priorities of the one or more cells, at least one cell whose speed priority matches the movement speed grade from the one or more cells as the at least one candidate cell comprises:
    acquiring level differences between the speed priorities of the one or more cells and the movement speed grade of the terminal device; and
    determining at least one cell corresponding to a smallest level difference between the speed priorities of the one or more cells and the movement speed grade of the terminal device as the at least one candidate cell, wherein the speed priority of the at least one candidate cell matches the movement speed grade of the terminal device.

3. The method according to claim 2, wherein when one of the level differences is equal to 0, the speed priority of the corresponding candidate cell completely matches the movement speed grade of the terminal device; and
    when one of the level differences is not equal to 0, in the case of an upward matching, the speed priority of the corresponding candidate cell is higher in terms of level than the movement speed grade of the terminal device; or, in the case of a downward matching, the speed priority of the corresponding candidate cell is lower in terms of level than the movement speed grade of the terminal device.

4. The method according to claim 3, wherein when one of the level differences is not equal to 0, whether the upward matching or the downward matching is to be performed is determined according to a prior agreement or according to an indication from a network side device.

5. The method according to claim 2, wherein in the case that level differences between speed priorities of all neighboring cells in current neighboring cell configuration information of the terminal device and the movement speed grade of the terminal device are all greater than the smallest level difference, and a strength of a signal received by the terminal device from a current cell is greater than a preset threshold, the terminal device does not start a process of searching for a cell whose speed priority has a smaller level difference from the movement speed grade of the terminal device.

6. An apparatus for cell selection or reselection, applied to a terminal device, and comprising: a processor, a memory, and a computer program stored in the memory and configured to be executed by the processor, wherein the processor is configured to execute the computer program to implement the following steps:
    acquire speed priorities of one or more cells and a movement speed grade of the terminal device; and
    perform cell selection or cell reselection according to the speed priorities and the movement speed grade;
    wherein each of the speed priorities further comprises speed priority range information, and the speed priority range information is configured to identify a service range of a speed priority of a cell; and the processor is configured to execute the computer program to implement the following steps:

selecting, by comparing the movement speed grade with the speed priorities of the one or more cells, at least one cell whose speed priority matches the movement speed grade from the one or more cells as at least one candidate cell, wherein the terminal device is in the service range of the speed priority of the at least one candidate cell; and further performing the cell selection or cell reselection in the at least one candidate cell according to a cell frequency priority.

7. The apparatus according to claim 6, wherein the processor is configured to execute the computer program to implement the following steps:

acquire level differences between the speed priorities of the one or more cells and the movement speed grade of the terminal device; and determine at least one cell corresponding to a smallest level difference between the speed priorities of the one or more cells and the movement speed grade of the terminal device as the at least one candidate cell, wherein the speed priority of the at least one candidate cell matches the movement speed grade of the terminal device.

8. The apparatus according to claim 7, wherein when one of the level differences is equal to 0, the speed priority of the corresponding candidate cell completely matches the movement speed grade of the terminal device; and when one of the level differences is not equal to 0, in the case of an upward matching, the speed priority of the corresponding candidate cell is higher in terms of level than the movement speed grade of the terminal device; or, in the case of a downward matching, the speed priority of the corresponding candidate cell is lower in terms of level than the movement speed grade of the terminal device.

9. The apparatus according to claim 8, wherein when one of the level differences is not equal to 0, whether the upward matching or the downward matching is to be performed is determined according to a prior agreement or according to an indication from a network side device.

10. The apparatus according to claim 7, wherein in the case that level differences between speed priorities of all neighboring cells in current neighboring cell configuration information of the terminal device and the movement speed grade of the terminal device are all greater than the smallest level difference, and a strength of a signal received by the terminal device from a current cell is greater than a preset threshold, the terminal device does not start a process of searching for a cell whose speed priority has a smaller level difference from the movement speed grade of the terminal device.

* * * * *